Oct. 13, 1970     G. F. BARTEL     3,534,129
SEAT CONSTRUCTION AND THE LIKE
Filed March 21, 1968     2 Sheets-Sheet 1
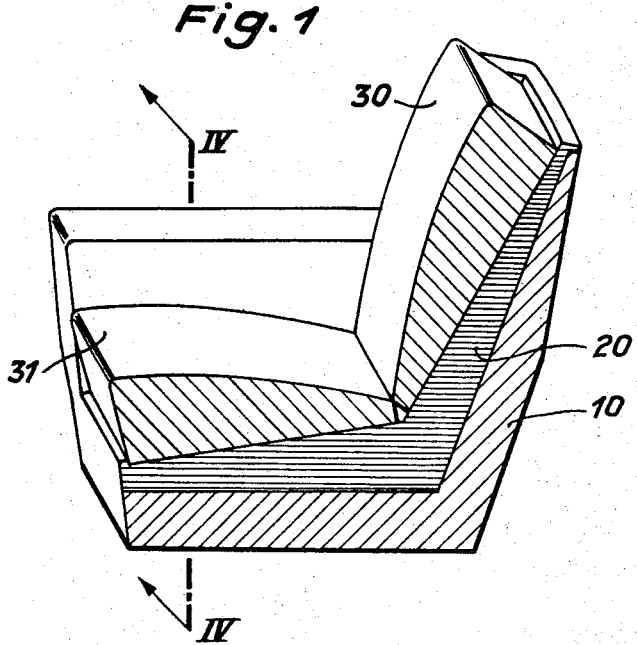
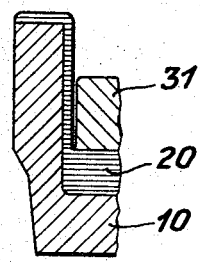
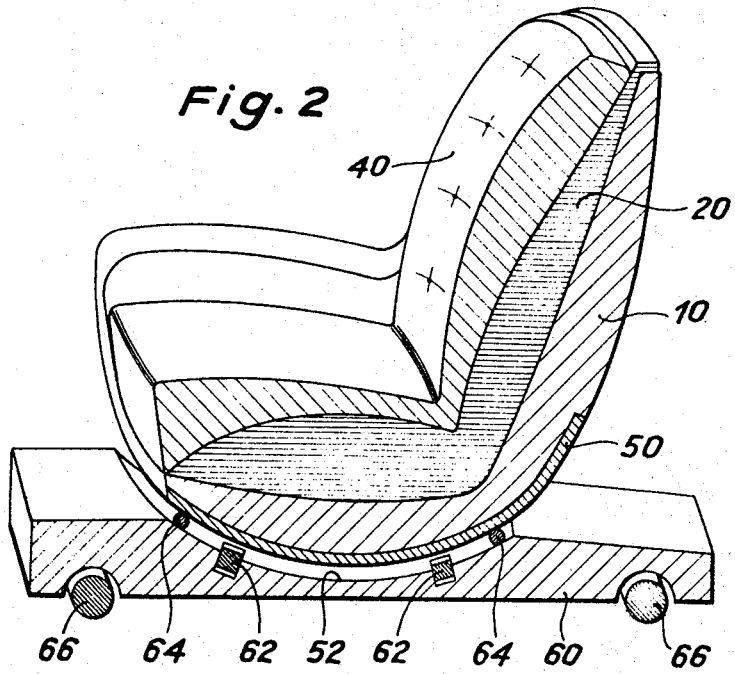

Oct. 13, 1970   G. F. BARTEL   3,534,129
SEAT CONSTRUCTION AND THE LIKE
Filed March 21, 1968   2 Sheets-Sheet 2

United States Patent Office 3,534,129
Patented Oct. 13, 1970

3,534,129
SEAT CONSTRUCTION AND THE LIKE
Gunter Friedrich Bartel, Tecklenburg, Germany, assignor to Elastomer A.G., Chur, Switzerland, a corporation of Switzerland
Filed Mar. 21, 1968, Ser. No. 714,964
Claims priority, application Germany, Apr. 6, 1967, 1,685,172
Int. Cl. B29d 9/00
U.S. Cl. 264—45     4 Claims

ABSTRACT OF THE DISCLOSURE

A seat such as a chair, sofa or the like having a rigid polyurethane foam frame and a semi-rigid polyurethane foam upholstery layer cohesively bound together is molded in separate molding steps without removal from the mold between molding steps.

This invention relates generally to an article of furniture and more particularly to a seat of novel construction and a method and apparatus for making it.

A chair or similar seat is usually constructed by assembling separately constructed frame, springs and cushions. The frame is often made from wood and has coil springs or spring elements supported between the chair bottom and cushion upon which the occupant sits. Legs, rollers or the like are built into the frame or attached to it before or after upholstering chairs. An upholstered vehicle seat is installed on a track or in a fixed position in the vehicle.

It has been proposed to use plastics in seat construction and polyurethane foams have been accepted commercially particularly for making seat cushions. It has also been proposed to mold the supporting portion and the cushioning portion of a chair separately and to later adhesively bind them together. One such method is disclosed in U.S. Pat. 3,314,721. Methods of this type have the disadvantage of requiring handling of the elements of the chair and the resulting product may separate into its component parts if the adhesive deteriorates upon aging.

It is an object of this invention to provide an improved method of molding a plastic seat. Another object of the invention is to provide a method for making a unitary upholstered seat frame having molded elements cohesively bound together. Still another object of the invention is to provide an improved seat construction having component parts of differing degrees of rigidity molded into cohesively bound relationship.

Other objects will become apparent from the following description with reference to the accompanying drawing in which:

FIG. 1 is a perspective view, partially in section, of one embodiment of this invention;

FIG. 2 is a perspective view, partially in section, of an other embodiment of the invention which is adapted for installation in a vehicle;

FIG. 4 illustrates in a fragmentary section a portion of the embodiment of FIG. 1 taken along the line IV—IV.

Figure 3:
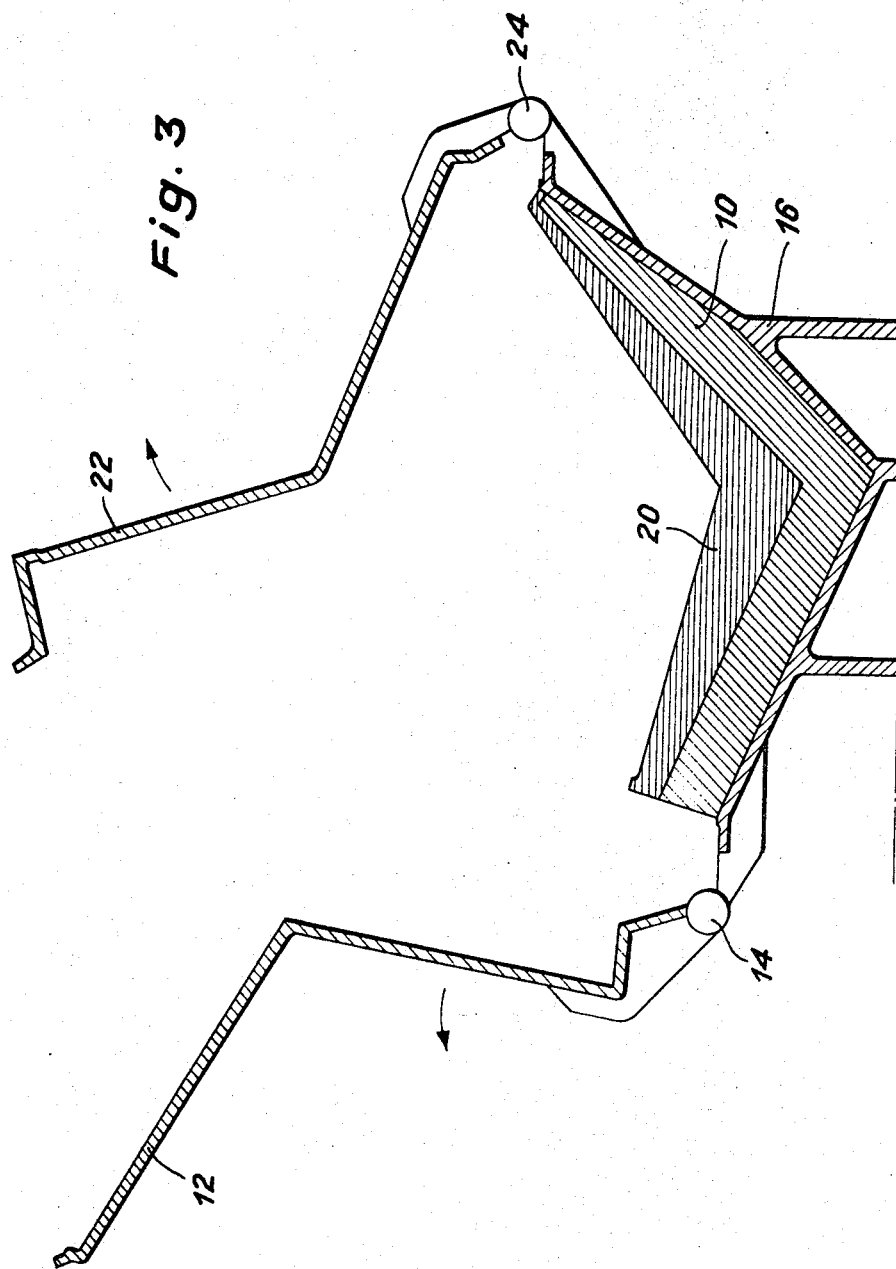
FIG. 3 illustrates diagrammatically an embodiment of an injection mold suitable for molding a seat in accordance with this invention.

The foregoing objects and others are accomplished in accordance with this invention, generally speaking, by providing a seat having a frame or support of molded rigid polyurethane foam and an upholstery layer of a semi-rigid polyurethane foam cohesively bound together. Such a seat is made in accordance with this invention by molding the frame from a foamable polyurethane reaction mixture which expands into a rigid polyurethane and then molding an upholstering element over the frame before removing it from the mold from a foamable reaction mixture which expands and solidifies into a semi-rigid polyurethane foam. The resulting molded construction may then be covered with a cushion of flexible polyurethane foam.

The process provided by this invention is not only simpler than those heretofore available but is also less expensive. Mold costs are greatly reduced because the same mold bottom can be used interchangeably with several lids or tops of different configurations to produce seats having a variety of shapes all having the same basic frame structure. Also, as described in more detail hereinafter, danger of damaging the frame during construction of the seat is avoided by leaving the frame in the protective mold until after the frame has been upholstered.

In one embodiment of the invention, the frame of rigid polyurethane foam, the upholstery of semi-rigid polyurethane foam and a cushion layer of flexible polyurethan foam are molded successively without removal from the mold, using the same mold bottom but changing the mold top and the composition of the foamable reaction mixture. This process can be practiced to advantage using an apparatus of the type described in my copending application Ser. No. 710,903, filed Mar. 6, 1968, based on German application No. E 33,545, filed Mar. 8, 1967. With such an apparatus the same reactive components can be used in making all of the polyurethane foams with the rigidity or flexibility thereof being determined by the ratio of components used.

The necessary fastening means for installation of legs or for securing the seat to a vehicle floor can be placed in the mold and the frame molded thereabout, if desired.

Rigid polyurethane foams, semi-rigid polyurethane foams and flexible polyurethane foams and formulations and technics for making them are widely known. For example, both methods and compositions for making foams suitable for use in this invention are disclosed in "High Polymers," vol. XVI, entitled "Polyurethanes: Chemistry and Technology," Part II, by J. H. Saunders and K. C. Frisch, published by Interscience Publishers in 1964. Flexible foams particularly advantageous for use in this invention are described in copending U.S. patent application Ser. No. 677,013. It is preferred to use poly (alkylene ether) polyurethanes prepared from known two component systems which are mixed together at the time of molding.

A rigid polyurethane foam best suited for use as a frame in accordance with this invention has a density of at least about 40 kg./m.$^3$ a compressive strength of about 2.5 kp./cm.$^2$ at 8% compression and a flexure strength of about 4 kp./cm.$^2$ at 17 mm. bending. The rigid foam may be made self-extinguishing, if desired.

A flexible foam well adapted for use herein has a compression set of less than about 5% after 72 hours at room temperature. Its deflection at 40% deformation must not be greater than about 20 p./cm.$^2$ Its elongation should be not less than about 100%. A semi-rigid foam has properties between those of the rigid foam and flexible foam and at 40% deformation should have a deflection of about 50 p./cm.$^2$. The exact degree of rigidity and flexibility will vary within conventional limits from one seat construction to another depending upon where it will be used.

The method provided by this invention is particularly advantageous for molding polycaprolactone polyester polyurethanes because reaction mixtures which produce such polyurethanes can be reacted at room temperature or over a wide temperature range Because of the non-critical reaction temperature, mold design can be simple without means for heating the mold. The apparatus and compositions disclosed in my aforesaid application can be used to mix and meter the foamable reaction mixture into the mold.

As indicated hereinbefore, the mold used to manufacture the seat is so designed that the mold bottom and one top cooperate to shape the frame. The same bottom containing the molded frame then combines with a second mold top to shape the upholstery. If a cushion is molded on top of the upholstery, a third top is combined with the bottom and molded in place while the frame and upholstery unit is still in the mold.

One of the important advantages of this invention is realized by using a foamable reaction mixture containing as the polyol a polycaprolactone polyester. Compositions and a process suitable for making foams suitable for this invention are disclosed in U.S. Pat. 3,240,730. Systems comprising a quasi-prepolymer mixture of poly (alkylene ether) polyol and an organic polyisocyanate and a second component which is a mixture of a polyfunctional polyether polyol, water and catalyst can also be used to advantage but the polycaprolactone polyester based systems are preferred. With the latter system an exceptionally wide range of rigidity can be obtained by variation in formulation permitting the use of several mixing devices to charge different compositions into the mold as described in more detail in my aforesaid application Ser. No. 710,903. All of these mixing devices can draw from the same storage tank but use different ratios thereof to obtain different degrees of rigidity in the resulting foam. It then becomes possible, for example, to supply the material for the upholstery and the cushion or finish upholstery in successive steps through the same mix head. In this case the time required for switching the metering head and for changing the mold top is just sufficient for the mixture introduced in the first step to foam out completely, particularly when materials reacting at room temperature are used.

The process of the invention is advantageous for making a large number of the same kind of seats at low cost. It is therefore particularly advantageous for making seats for automobiles, aircraft and the like where special designs are required but large numbers of seats of the same design are used. A method for making a vehicle seat having a concave metal insert forming the base of the seat frame is described hereinafter. The fabrication of a molded frame above a concave surface is ordinarily very difficult and expensive because it does not have any ridges or corners to facilitate adherence of the foam thereto. However, it can be accomplished in a simple manner in accordance with this invention on a mass production scale.

It is to be noted that because one foam layer is molded directly over the other, the frame, upholstery and molded cushion are cohesively bound together forming a strong unitary construction not depending upon an adhesive composition.

Referring now to the drawings, FIGS. 1 and 4 illustrate one embodiment of a chair having a supporting member or frame 10 of rigid polyurethane foam shaped into a bottom or seat portion, a back and arm portions, and a semi-rigid polyurethane foam upholstery layer 20; the opposing surfaces of 10 and 20 being securely bound together because 20 was foamed in place over the surface of 10 as will be explained in more detail hereinafter. As illustrated in FIGS. 1 and 4, the thickness of frame 10 and upholstery 20 varies depending upon the particular part it is to form of the completed chair. The softness or rigidity of the various parts of the chair can be varied to the anatomical requirements of an occupant of the chair by a variation in thickness of the upholstery 20. The chair of FIGS. 1 and 4 is the type which has loose or removable cushions 30 and 31 of flexible polyurethane foam covered with a textile leather or vinyl covering of the type conventionally used in upholstered furniture. Chair legs, castors or the like can be attached in appropriate locations on the underside of frame 10 by conventional methods to the completed chair.

FIG. 3 illustrates schematically the chair of FIG. 1 positioned in a mold in which it has been fabricated. In molding frame 10, mold top 12 is swung to the right as positioned in the drawing, pivoting on hinge 14 attached to mold bottom 16 until the mold is closed forming internally the outline of frame 10. A metered amount of liquid polyurethane foaming mixture is injected into the mold where it expands and solidifies into a rigid polyurethane foam frame 10. Mold top 12 is then swung out of the way and the second mold top 22 mounted on mold bottom 16 by means of hinge 24 is swung into place with frame 10 still positioned in the mold. Closing of the mold with top 22 leaves a cavity above frame 10 in the mold having the configuration of upholstery 20. This cavity is filled by metering in a predetermined volume of liquid foamable polyurethane composition which expands to fill the void and solidifies into a semi-rigid polyurethane upholstery layer 20 with the opposing surfaces of frame 10 and upholstery 20 being cohesively bound together. For simplicity, mold tops 12 and 22 are shown in section, it being understood that side parts are provided having the contour of the arm portions shown in FIGS. 1 and 4. Frame 10 can be used to support upholstery layers 20 of various configurations by replacing mold top 22 with a top of other desired configurations.

Mold bottom 16 can be attached to more than two mold tops when a seat or chair is to be provided with more than two molded layers or elements.

FIG. 2 illustrates a seat molded in one mold bottom with three mold tops, the seat having frame 10 of rigid polyurethane foam, upholstery 20 which is molded semi-rigid polyurethane foam and a molded flexible polyurethane foam cushion 40. The seat was molded in accordance with the process described above with reference to FIG. 3 but the mold had three tops and three separate foamable polyurethane compositions were injected successively into mold cavities formed by the tops.

The seat of FIG. 2 is provided with concave cap 50 of a magnetizable material such as, for example, soft iron, nickel or other metal. Cap 50 was placed in the mold before the foaming mix which formed frame 10 and upon charging the polyurethane foaming mix for frame 10 in the mold, the foamable liquid reaction mixture expanded and solidified in the mold cavity with cap 50 covering part of that side which was to be the external support side of frame 10. In the embodiment of FIG. 2, cap 50 has an external convex surface which pivots in concave shaped recess 52 of carriage 60. Ball bearings 64 reduce friction between 52 and 50. Electric or permanent magnets 62 embedded in carriage 52 hold the seat in position with respect to carriage 52. Rollers 66 assist in horizontal movement permitting adjustment, an arrangement particularly advantageous for a vehicle seat. The arresting magnets 62, if electromagnets, can be turned on and off when reclining the seat. If magnets 62 are permanent magnets, they can be mechanically actuated in some circumstances with the use of magnet short circuit devices.

This invention also makes is possible to make seats provided with air pockets or voids which can be inflated. To accomplish this, a film or films of a plastic material such as, for example, polyvinyl chloride film is inserted between the layers of the polyurethane foams over preselected areas to prevent the foam of one layer from being cohesively bound to the adjacent one in the area covered by the film. The two adjacent layers of polyurethane foam cohere to each other around the edges of the film, however, to form a pocket or void.

Although the invention has been described in considerable detail for the purpose of illustration, it is to be understood that such detail is solely for this purpose and that variations can be made by those skilled in the art without departing from the spirit or scope of the invention.

I claim:

1. A method for making a seat having molded frame and upholstery elements cohesively bound together which comprises charging the cavity of a mold defined by a mold bottom and a first lid which combine to provide the configuration of said frame with a foamable polyurethane reaction mixture which expands and solidifies into a rigid polyurethane foam filling said cavity, replacing the said first lid with a second lid while leaving the solidified rigid polyurethane in its position adjacent the said mold bottom, said second lid and said solidified rigid foam in said mold bottom combining to define a cavity having the configuration of an upholstery element, charging the last said cavity with a foamable polyurethane reaction mixture which expands and solidifies into a semi-rigid polyurethane which substantially fills the cavity and is cohesively bound to the underlying foam frame, and thereafter removing the resulting seat from the mold.

2. The method of claim 1 in combination with the step of replacing the lid after molding the upholstery element but before removal of the upholstery from the mold with one which in combination with the mold bottom and the molded frame and upholstery unit forms a cavity having the configuration of a cushioning layer, charging the resulting cavity with a foamable polyurethane reaction mixture which expands to fill the cavity and solidifies into a flexible polyurethane foam cushion.

3. The method of claim 1 wherein the mold bottom has a concave internal surface a magnetizable concave element is placed in the mold with its external surface lying against said concave surface of the mold bottom and the foamable polyurethane reaction mixture is then charged into the mold cavity and expands and solidifies into a rigid polyurethane foam frame bound to said element.

4. The method of claim 3 wherein the resulting molded rigid foam frame and cohesively bound upholstery element are assembled with a carriage with the magnetizable convex element of said frame lying in a complementary concavity in said carriage having at least one magnet on its concave surface opposite said magnetizable element.

References Cited

UNITED STATES PATENTS

| | | | |
|---|---|---|---|
| 2,394,122 | 2/1946 | Vrmston | 264—45 |
| 2,838,100 | 6/1958 | Follows | 297—452 |
| 2,845,997 | 8/1958 | Waite. | |
| 3,112,987 | 12/1963 | Griffiths et al. | 264—45 |

JULIUS FROME, Primary Examiner

L. GARRETT, Assistant Examiner

U.S. Cl. X.R.

264—54; 297—452